United States Patent Office 3,574,656
Patented Apr. 13, 1971

3,574,656
WALLPAPER
Barry John Sauntson, Rushden, Jack Bernard Haywood, Wellingborough, Brian George Elgood, Higham Ferrers, and Graham Brown, Wellingborough, England, assignors to Scott Bader & Co. Limited, Wellingborough, England
Filed June 19, 1967, Ser. No. 647,126
Claims priority, application Great Britain, June 23, 1966, 28,213/66
Int. Cl. B44d 1/10, 1/14
U.S. Cl. 117—6     16 Claims

ABSTRACT OF THE DISCLOSURE

Ground coated wallpaper is provided with a washable and strippable coating by applying an aqueous emulsion of a copolymer consisting essentially of 30–80 parts by weight of vinylidene chloride and 70–20 parts by weight of an alkyl acrylate and/or methacrylate. Part of the alkyl acrylate or methacrylate may be replaced by acrylonitrile and/or methacrylonitrile, and other monomers may be present, notably the amide of acrylic or methacrylic acid, and/or a copolymerisable acid such as acrylic or methacrylic acid.

---

Figure 2:
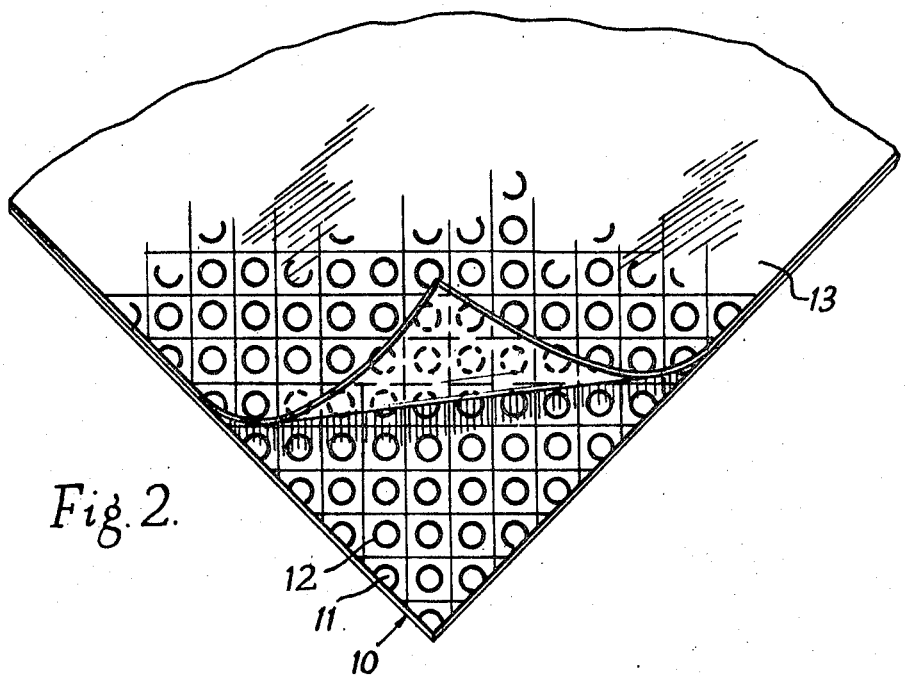

The invention relates to a new process for the manufracture of washable wallpaper which is easily removable from walls after its useful life.

Washable wallpaper is normally prepared by coating ground coated wallpaper with a synthetic resin emulsion. Usually the ground coat is overprinted over part of the surface, thus providing a pattern. The most widely used emulsions are plasticised polyvinyl acetate emulsions, acrylic ester/styrene copolymer emulsions, and styrene/butadiene copolymer emulsions. Such emulsions dry to form adherent films which offer a measure of washability and resistance to greases and stains. The extent of these properties depends on the coating weight and the type of resin used. Other properties which are important are: resistance to discolouration, especially that caused by exposure to light, and lack of surface tack so that paper in rolls does not stick together. This sticking is known as blocking in the trade and is particularly important when paper is reeled warm after coating.

Washable wall paper has a serious disadvantage when compared with conventional wall paper for, whereas non washable paper can easily be removed by wetting and thus loosening the water soluble gum sticking it to the wall, washable paper will not permit the free passage of water to reach the adhesive. Hence it is necessary either to scrape or to burn off the paper before redecorating is possible. This process is both lengthy and arduous.

This disadvantage may be overcome by laminating on to the paper a plastic film, such as a polyvinyl chloride, in such a way that it adheres sufficiently for normal use but, after starting delamination with a knife or suitable tool, will readily peel off thus leaving the paper itself readily removable by water. However, the cost of this lamination process is high and the resultant product is consequently expensive.

To be able to easily delaminate any film from wallpaper, two conditions must be fulfilled:
(1) The adhesion of the film to the paper most be sufficient to prevent delamination in normal use but be low enough to permit stripping off with comparative ease when delamination is started.

(2) The film must be flexible and have sufficient tensile strength to enable reasonably large areas to be peeled off without tearing.

An object of the present invention is to provide a method of treating a ground coated wallpaper to provide a satisfactory washable coating which can be readily stripped when required.

Another object of the invention is to provide such a method which will give a good coating at a lower price than the methods hitherto used.

A further object is to provide an economical wallpaper having a durable adherent washable coating which can easily be removed when it is desired to take the paper off the wall.

Other objects and advantages will be readily apparent to those skilled in the art from the following description and drawings.

Basically our invention resides in the discovery that coatings applied by coating with certain synthetic resin emulsions will give a strippable washable coating which provides a much cheaper process than lamination for preparing such papers.

Figure 1:
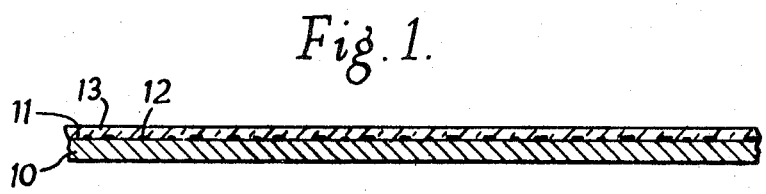

In the accompanying drawings which illustrate an example according to our invention:

FIG. 1 is a cross-section through a fragment of wallpaper bearing the coating of the present invention; and FIG. 2 is a view of the corner of a sheet of such paper showing the coating being stripped off.

In the drawings, reference numeral 10 designates a wallpaper to the upper surface 11 of which has been applied a ground coating; over the ground coating the wallpaper 10 has been printed at 12 to give a pattern. Finally, over the printing there has been applied the synthetic resin emulsion of our invention which will be described in further detail below. Our new synthetic resin emulsion gives a coating 13 which adheres well as long as required but which can readily be stripped off the paper as shown in FIG. 2.

With most synthetic resin emulsions it is difficult to meet the conditions defined above to obtain easy removal without impairing other properties necessary for making a commercially acceptable washable wallpaper. Adhesion and hence strippability is effected by many factors and we have found that the following are most important: the amount of penetration of the emulsion into the wallpaper, the amount of binder present in the ground coat, and the coating weight of the ground coat.

Penetration is mainly affected by the solids content and the viscosity of the coating and the time that elapses before the drying emulsion solidifies. The most widely used method for coating wallpaper is by roller application and removal of excess emulsion with an air knife doctor, followed by tunnel drying. Where this method is used the time taken for sufficient water to evaporate to cause solidification of the emulsion is comparatively long and emulsions used should have comparatively high solids contents and viscosities. Where, however, coating speeds and drying rates are fast, emulsions of lower solids content and viscosities may be used.

In general we have found that to achieve satisfactory strippability the ground coat should have pigment:binder ratios of between 6:1 and 14:1. The binder may be starch, casein and/or synthetic resin emulsions or solutions such as styrene-acrylic or polyvinyl acetate copolymer emulsions or polyvinyl alcohol. Preferably ground coats having the higher pigment binder ratios in this range should be used.

We have also found that normally the coating weight of the ground coat should be higher than 20 grams per square metre and preferably 20–25 grams per square metre. Strippability is impaired if ground coated paper having a coating weight of less than 20 grams per square metre is used.

It is difficult to design a synthetic resin emulsion that will be sufficiently flexible and have a high enough tensile strength to be easily stripped without tearing and at the same time maintain freedom from surface tack to enable the paper to be reeled without blocking. For instance a typical polyvinyl acetate emulsion used for making washable walpaper will contain at the most 10% of dibutyl phthalate plasticiser. Films deposited will, especially in cold weather, be too brittle to peel off but, if the resin is made more flexible by adding more plasticiser, severe blocking will occur in rolls of paper.

We have found that certain vinylidene chloride/acrylic or methacrylic acid ester copolymer emulsions will give coatings which have both non-blocking properties and are easily delaminated from wallpaper. Moreover such coatings have high gloss, excellent wash and grease resistance and good colour stability. The proportions of vinylidene chloride and alkyl acrylate or methacrylate to form these copolymers lie within the composition range defined as follows:

Vinylidene chloride 30–80 parts by weight and alkyl acrylate and/or alkyl methacrylate having an alkyl chain length of 1–8 carbon atoms 70–20 parts by weight. The preferred range is vinylidene chloride 50–70 parts by weight and the said alkyl acrylate and/or alkyl methacrylate 50–30 parts by weight. We have found that the above mentioned properties may also be obtained by the inclusion of acrylonitrile and/or methacrylonitrile in the copolymer in place of part of the alkyl acrylate or methacrylate. Preferably the amount used should be up to 15 parts by weight based on 100 parts by weight of polymer. The required properties may be obtained in some cases with either one acrylate or methacrylate ester comonomer or in other cases by a mixture thereof, with or without acrylonitrile or methacrylonitrile provided that the film is not too sticky and is flexible enough to effect delamination.

The copolymer is preferably prepared by a delayed addition technique according to which polymerisation is initiated with a minor amount of one of the monomers or a mixture of the monomers followed by the controlled addition, which may be continuous or stepwise, of the remainder of the monomers until the required polymerisation has been effected. The copolymer may contain minor amounts of other ingredients than those mentioned including compounding ingredients.

In general such polymers should have sufficiently high molecular weights to give films which are strong enough to permit stripping without too much breaking or tearing. For example, we have observed that, for a copolymer from 70 parts by weight of vinylidene chloride and 30 parts by weight of ethyl acrylate, there is a progressive tendency for films to tear and come off in small pieces with polymers of lower molecular weight. To compare molecular weight we determined the relative viscosity of a solution in tetrahydrofuran containing 2.5 grams per litre. Polymers made having a relative viscosity of less than 1.2 were found to be unsuitable and those having a relative viscosity higher than 1.26 were most suitable. These values will be different for other polymers taken from the invention but in general those having low molecular weights are unsuitable.

We have previously observed that, where normal wallpaper coating equipment is used, the viscosity and solids content should both be high enough to prevent too much penetration of the emulsion into the ground coat. This is also desirable to enable high coating weights to be applied in one coat. In general we have found that an emulsion, having a solids content of 55% and a viscosity of 200–500 cps. (measured at a shear rate of 12.62 secs.$^{-1}$ at 25° C. using a Ferranti Portable Viscometer) will be suitable when it is diluted to 50% solids. This may be achieved by several ways, but we have found the most satisfactory to include in the copolymer up to 10 parts by weight and preferably 1–2 parts by weight of acrylamide or methacrylamide based on 100 parts by weight of the mixture of monomers referred to earlier—i.e. the total quantity of vinylidene chloride alkyl acrylate, alkyl methacrylate, acrylonitrile and methacrylonitrile.

The copolymer composition may also include small amounts (say up to 8 parts by weight) of a copolymerisable acid such as acrylic or methacrylic acid. Such emulsions may be used with advantage to obtain sufficient adhesion on to wallpapers having surfaces to which adhesion is difficult.

Coating weights should preferably be at least 32 grams per square metre (this is equivalent to 6 oz. per piece of wallpaper—a piece being the size the paper is cut into for sale and is 20⅞" wide and 11 yards long), and are normally in the range of 32–48 grams per square metre or 6–9 oz. per piece. However, if desired, higher coating weights may be used to enhance gloss and protection.

The coating may be applied either as a single coating or as two or more coatings of one or more resin emulsions. The use of a multiple coating system may be used with advantage where a coating machine is equipped with multiple coating heads and drying units. It is particularly useful for ensuring complete freedom from pin-point sized voids in the emulsion coating which may occur when wallpaper with highly raised printing known in the trade as "plastics" or "raised whites" is used.

The invention is illustrated by the following examples in which parts are given by weight:

EXAMPLE 1

A vinylidene chloride/acrylic ester copolymer emulsion was prepared using the following formulation and method.

|     |     | Parts |
| --- | --- | ---: |
| (1) | Water | 338.425 |
| (2) | Magnapol amylopectin | 0.500 |
| (3) | Antarox CO850 | 3.000 |
| (4) | Acetic acid | 0.250 |
| (5) | Sodium acetate | 0.600 |
| (6) | Ammonium persulphate | 0.125 |
| (7) | 5% sodium metabisulphite | 2.500 |
| (8) | Vinylidene chloride | 280.000 |
| (9) | Butyl acrylate | 112.000 |
| (10) | Methyl acrylate | 168.000 |
| (11) | Acrylamide | 5.000 |
| (12) | Antarox CO850 | 10.200 |
| (13) | Satinol 75% active | 4.400 |
| (14) | 5% sodium metabisulphite | 12.500 |
| (15) | Water | 50.000 |
| (16) | 5% ammonium persulphate | 12.500 |

"Magnapol Amylopectin" is the trade name for a commercial grade polysaccharide produced by the A. E. Staley Manufacturing Company.

"Antarox CO850" is the trade name for a nonylphenoxy poly (ethyleneoxy) ethanol made by the General Aniline and Film Corporation.

"Satinol" is the trade name for a technical grade of the sodium salt of sulphated lauryl alcohol made by Laporte Chemicals Ltd.

METHOD

Items (2), (3), (4), (5) and (6) were dissolved in item (1) in a 2 litre round bottomed flask fitted with a reflux condenser and half-moon shaped stirrer and purged with nitrogen. Items (8), (9) and (10) were mixed together in a separate container as were items (11), (12), (13), (14) and (15). One twentieth of items (8), (9) and (10) were added to the flask and the temperature raised to 40° C. Item (7) was then added to initiate the reaction and as soon as the initial reaction was over the remainder of items (8), (9) and (10), the solution of items (11), (12), (13), (14) in (15) and items (16) were added at separate points and at equivalent rates over a period of two hours. An exothermic reaction took place requiring cooling to maintain the temperature at 40–45° C. After the additions the reaction quickly subsided leaving a fine particle size emulsion of viscosity 500 cps. shear rate 12.62 sec.$^{-1}$ at 25° C.), and having a solids content of 56.0%.

The emulsion was diluted to 50% solids content and applied to a printed wallpaper, having a ground coat bound with casein (solubilised with sodium carbonate) and having a pigment:binder ratio of 10:1 by weight, by roller coating followed by an air knife doctor. The paper was then passed through a tunnel heated to 280° F. and, after drying, reeled. The reel of paper was left 24 hours and then unwound, without any blocking, and cut into pieces.

The coated paper was glossy and the coating weight was found to be 34 grams per square metre. The paper was pasted on to a wall and, after drying, was smeared with butter, shoe polish, coffee, tomato ketchup and lipstick. After leaving for 24 hours these were wiped off with a damp cloth. The surface was found to be unblemished. In addition ink was splashed on the wallpaper and left to dry for one hour and this too was wiped off without staining the paper.

When a corner of the emulsion coating was prised away from the paper with a knife and pulled it was possible to delaminate the coating easily from the paper and hence expose the paper for removal in a conventional manner.

EXAMPLE 2

An emulsion was prepared according to the following formulation:

| | Parts |
|---|---|
| (1) Water | 338.425 |
| (2) Magnapol amylopectin | 0.500 |
| (3) Antarox CO850 | 3.000 |
| (4) Acetic acid | 0.250 |
| (5) Sodium acetate | 0.600 |
| (6) Ammonium persulphate | 0.125 |
| (7) 5% sodium metabisulphite | 2.500 |
| (8) Vinylidene chloride | 392.000 |
| (9) Ethyl acrylate | 165.500 |
| (10) Acrylic acid | 2.500 |
| (11) Acrylamide | 5.000 |
| (12) Antarox CO850 | 10.200 |
| (13) Satinol 75% active | 4.400 |
| (14) 5% sodium metabisulphite | 12.500 |
| (15) Water | 50.000 |
| (16) 5% ammonium persulphate | 12.500 |

The method of preparation was exactly as for Example 1 and a fine particle size emulsion having a viscosity of 460 cps. (shear rate 12.62 sec.$^{-1}$ at 25° C.) and a solids content of 55.8% was obtained. The emulsion was again diluted to 50% solids content and coated as in Example 1 on to printed wallpaper, which has a ground coat bound with a styrene/acrylic copolymer emulsion at a pigment: binder ratio of 6:1 by weight. The coated paper was found to have a coating weight of 34 grams per square metre and was treated and tested in exactly the same way and the same result was obtained as in Example 1. Particular attention was paid to adhesion and it was observed that the paper could be cut and coated without delamination occurring. However, after ageing the paper could be readily delaminated in preparation for removal as described in Example 1.

This wall paper was further treated by passing through cold embossing rollers at a pressure of 300 lbs. per linear inch. The poper was satisfactorily embossed without the coating cracking or sticking and the strippability was not impaired.

EXAMPLE 3

An emulsion was prepared according to the following formulation:

| | Parts |
|---|---|
| (1) Water | 338.425 |
| (2) Magnapol amylopectin | 0.500 |
| (3) Antarox CO850 | 3.000 |
| (4) Acetic acid | 0.250 |
| (5) Sodium acetate | 0.600 |
| (6) Ammonium persulphate | 0.125 |
| (7) 5% sodium metabisulphite | 2.500 |
| (8) Vinylidene chloride | 392.000 |
| (9) Butyl acrylate | 120.000 |
| (9a) Acrylonitrile | 45.000 |
| (10) Acrylic acid | 2.500 |
| (11) Acrylamide | 5.000 |
| (12) Antarox CO850 | 10.200 |
| (13) Satinol 75% active | 4.400 |
| (14) 5% sodium metabisulphite | 12.500 |
| (15) Water | 50.000 |
| (16) 5% ammonium persulphate | 12.500 |

The method used was exactly the same as for Example 1 except that items (8), (9), (9a) and (10) were mixed together and used in exactly the same way as items (8), (9) and (10) in Example 1.

A fine particle size emulsion having a solids content of 56.3% and a viscosity of 410 cp.s. (shear rate 12.62 secs.$^{-1}$ at 25° C.) was obtained.

The emulsion was diluted to 40% solids and coated on to a printed wallpaper where the printing was highly raised which had a ground coat bound with a vinyl acetate copolymer at a pigment:binder ratio of 6.4:1 by weight. Roller application followed by an air knife doctor was employed to apply the emulsion using a Jagenburg coating machine at a speed of 250 feet per minute. After drying the paper was immediately passed through a second set of coating equipment and another coat applied. The total coating weight was 40 grams per square metre of which 25 grams per square metre were applied at the first coating station. This wallpaper was tested in exactly the same way and gave similar results as that prepared in Example 1. It was particularly observed that it was completely free from pin holes which is a property difficult to achieve with this type of paper.

What we claim and desire to secure by Letters Patent is:

1. A method of treating wallpaper coated with a ground coat having a weight of between 20 and 25 grams per square metre, said ground coat comprising a pigment and a binder in a ratio of between 6:1 and 14:1 by weight, said method comprising the step of applying thereto an aqueous emulsion of a copolymer made essentially from
   (a) 30–80 parts by weight of vinylidene chloride
   (b) 70–20 parts by weight of a copolymerisable material selected from the group consisting of an alkyl acrylate, an alkyl methacrylate and mixtures thereof in which the alkyl chain length is from 1 to 8 carbon atoms, and
   (c) 0–15 parts by weight of a copolymerisable material selected from the group consisting of acrylonitrile, methacrylonitrile and mixtures thereof to form on the wallpaper a washable and strippable coating.

2. A method according to claim 1 wherein the copolymer is made essentially from 50–70 parts by weight of (a) and 50–30 parts by weight of (b).

3. A method according to claim 1 wherein the monomers forming the copolymer include, in addition to (a), (b) and (c) up to 10 parts by weight of a compound selected from the group consisting of acrylamide and methacrylamide based on 100 parts by weight of (a) plus (b) plus (c).

4. A method according to claim 1 wherein the monomers forming the copolymer include also a small amount of a copolymerisable acid selected from the group consisting of acrylic and methacrylic acid.

5. A method according to claim 1 wherein the viscosity of the emulsion (calculated at 55% solids) is in the range of 200–500 cps. (measured at a shear rate of 12.62 secs.$^{-1}$ at 25° C. using a Ferranti Portable Viscometer).

6. A method according to claim 1 wherein the washable and strippable coating applied to the wallpaper has a weight of at least 32 grams per square metre.

7. A method of treating wallpaper coated with a ground coat having a weight of between 20 and 25 grams per square metre, said ground coat comprising a pigment and a binder in a ratio of between 6:1 and 14:1 by weight, said method comprising the step of applying thereto an aqueous emulsion of a copolymer made essentially from
   (a) 50–70 parts by weight of vinylidene from
   (b) 30–50 parts by weight of a copolymerisable material selected from the group consisting of an alkyl acrylate, and alkyl methacrylate and mixtures thereof in which the alkyl chain length is from 1 to 8 carbon atoms
   (c) 0–15 parts by weight of a copolymerisable material selected from the group consisting of acrylonitrile, methacrylonitrile and mixtures thereof
   the total number of parts of (a), (b) and (c) amounting to 100
   (d) 0–10 parts by weight of a compound selected from the group consisting of acrylamide, methacrylamide and mixtures thereof, and
   (e) 0–8 parts by weight of a copolymerisable acid selested from the group consisting of acrylic and methacrylic acid
to form on the wallpaper a washable and strippable coating.

8. A method according to claim 7 wherein the viscosity of the emulsion (calculated at 55% solids) is in the range of 200–500 cps. (measured at a shear rate of 12.62 secs.$^{-1}$ at 25° C. using a Ferranti Portable Viscometer).

9. A method according to claim 7 wherein the washable and strippable coating applied to the wallpaper has a weight of at least 32 grams per square metre.

10. A wallpaper coated with a ground coat having a weight of between 20 and 25 grams per square metre, said ground coat comprising a pigment and a binder in a ratio of between 6:1 and 14:1 by weight, and a washable and strippable coating over said ground coat comprising a copolymer made essentialy from
   (a) 30–80 parts by weight of vinylidene chloride
   (b) 70–20 parts by weight of copolymerisable material selected from the group consisting of an alkyl acrylate, an alkyl methacrylate and mixtures thereof in which the alkyl chain length is from 1 to 8 carbon atoms
   (c) 0–10 parts by weight, based on 100 parts by weight of (a) plus (b) of a compound selected from the group consisting of acrylamide, methacrylamide and mixtures thereof, and
   (d) 0–8 parts by weight, based on 100 parts by weight of (a) plus (b) of a copolymerisable acid.

11. A wallpaper according to claim 10 wherein the copolymer is made essentially from 50–70 parts by weight of (a) and 50–30 parts by weight of (b).

12. A wallpaper according to claim 10 wherein (b) also includes from 0 to 15 parts by weight based on 100 parts by weight of (a) plus (b) of a copolymerisable material selected from the group consisting of acrylonitrile, methacrylonitrile and mixtures thereof.

13. A wallpaper according to claim 10 wherein a layer of printing partly covers the ground coat to form a pattern thereon and the washable and strippable coating coats said ground coat and said layer of printing.

14. A wallpaper according to claim 10 wherein the ground coat contains a binder selected from the group consisting of starch, casein, synthetic resin emulsions, and synthetic resin solutions.

15. A wallpaper according to claim 10 wherein the washable and strippable coating has a weight of at least 32 grams per square metre.

16. A wallpaper coated with a ground coat having a weight of between 20 and 25 grams per square metre said ground coat comprising a pigment and a binder selected from the group consisting of starch, casein, synthetic resin emulsions and synthetic resin solutions, the ratio of pigment to binder being between 6:1 and 14:1 by weight, a layer of printing partly covering said ground coat to form a pattern thereon, and a washable and strippable coating over said ground coat and layer of printing said coating comprising a copolymer made essentially from
   (a) 50–70 parts by weight of vinylidene chloride
   (b) 30–50 parts by weight of a copolymerisable material selected from the group consisting of an alkyl acrylate, an alkyl methacrylate and mixtures thereof in which the alkyl chain length is from 1 to 8 carbon atoms
   (c) 0–15 parts by weight of a copolymerisable material selected from the group consisting of acrylonitrile, methacrylonitrile and mixtures thereof
   the total number of parts of (a), (b) and (c) amounting to 100
   (d) 0–10 parts by weight of a compound selected from the group consisting of acrylamide, methacrylamide and mixtures thereof and
   (e) 0–8 parts by weight of a copolymerisable acid selected from the group consisting of acrylic and methacrylic acid.

References Cited

UNITED STATES PATENTS

| | | | |
|---|---|---|---|
| 2,395,992 | 3/1946 | Clark | 117—156 |
| 2,459,164 | 1/1949 | Holst | 117—6 |
| 2,538,737 | 1/1951 | Stanton et al. | 260—29.6(T) |
| 3,317,449 | 5/1967 | Isaacs et al. | 260—29.6(T) |
| 3,424,706 | 1/1969 | Smith et al. | 260—29.6(TA) |

ALFRED L. LEAVITT, Primary Examiner

J. A. BELL, Assistant Examiner

U.S. Cl. X.R.

117—45, 76, 156; 260—29.6